Sept. 30, 1958 — W. C. TUCKER — 2,853,898
MECHANISM FOR CONVERTING ROTARY MOTION
TO INTERMITTENT RECIPROCATORY MOTION
Filed Nov. 8, 1957

INVENTOR.
William C. Tucker,
BY Parker & Brochnow,
Attorneys.

United States Patent Office 2,853,898
Patented Sept. 30, 1958

2,853,898

MECHANISM FOR CONVERTING ROTARY MOTION TO INTERMITTENT RECIPROCATORY MOTION

William C. Tucker, Corfu, N. Y., assignor to Buffalo Forge Company, Buffalo, N. Y.

Application November 8, 1957, Serial No. 695,280

4 Claims. (Cl. 74—571)

This invention relates to mechanism for intermittently driving reciprocatory parts from a rotating shaft or the like by means of eccentrics.

In heavy duty machinery such for example as billet and plate shears, press brakes and the like, the reciprocatory, work-engaging member has heretofore generally been actuated by means of an eccentric mounted on a shaft, and a clutch or other coupling device has been employed to connect this shaft with a source of power, such as a driving shaft or the like. This clutch or coupling had to be of sufficient strength to instantaneously start the motion of a heavy eccentric and parts connected therewith from standstill, which resulted in severe strains on the clutch and on parts of the mechanism and also a noisy operation of the same.

It is an object of this invention to provide an improved actuating mechanism of this type which is constructed so as to materially reduce the amount of inertia which formerly had to be overcome for the purpose of starting the reciprocatory motion and thus produce a drive which is less noisy and which produces less shock and vibration of the machine on which the reciprocatory motion is produced.

Another object of this invention is to provide a driving mechanism for a reciprocatory, work-engaging part in which the usual clutch is replaced by a second eccentric arranged about the usual driving eccentric and which may rotate with the driving eccentric when no motion of the reciprocating member is required and which may be disconnected from the usual driving eccentric and connected with an eccentric strap when reciprocatory motion is desired.

Figure 4:
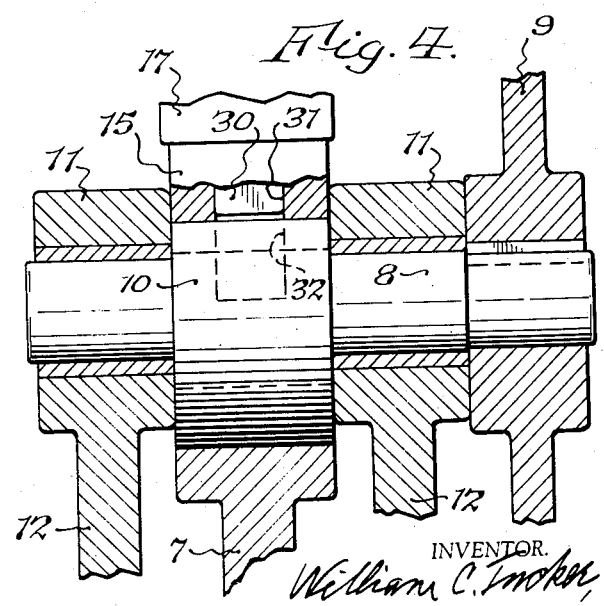
Fig. 4 is a fragmentary, central, sectional elevation of a machine on which my improved mechanism may be employed.

7 represents the eccentric strap of the mechanism, the lower end of which may be connected to a machine part to be reciprocated, and 8 represents a drive shaft of the machine which may be rotated in any suitable manner, for example, by means of a large gear 9 which is partly shown in Fig. 4. The shaft 8 has an eccentric 10 rigidly secured thereto or formed integral with the drive shaft 8. This shaft is journalled in suitable fixed bearings 11 of a machine, not shown, these bearings forming parts of a machine frame 12. The eccentric portion 10 of the shaft is arranged between the two bearings 11.

Figure 1:
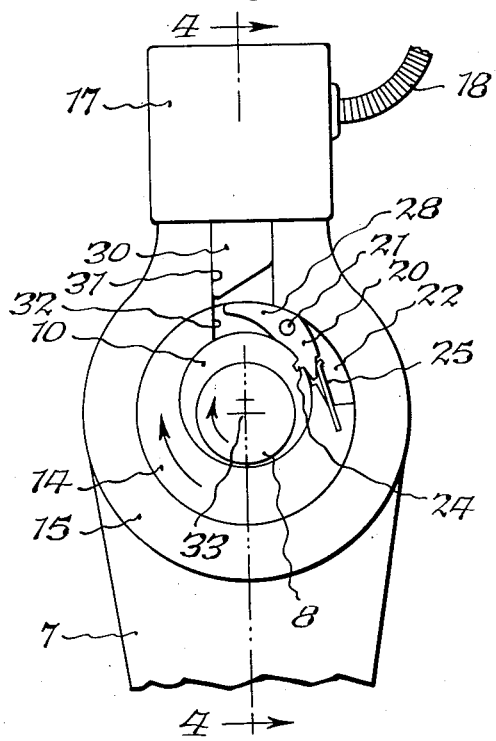
Fig. 1 shows more or less diagrammatically a mechanism embodying this invention, the parts being shown in the positions which they occupy when no reciprocatory stroke is desired.

The eccentric portion 10 of the shaft 8 is mounted to rotate within a second or outer eccentric 14 which in turn is journalled to rotate within the bearing portion 15 of the eccentric strap. The eccentricity or throw of the eccentrics 10 and 14 is the same, and when these two eccentrics are arranged as shown in Fig. 1, so that the portions of greatest eccentricity of the two eccentrics are diametrically opposite to each other, than the two eccentrics if connected to rotate together, will produce no motion of the eccentric strap 7, since the eccentricity of one eccentric will be offset by that of the other. In other words, when the two eccentrics are arranged as shown in Fig. 1, the outer surface of the second eccentric 14 will be concentric with the axis of the shaft 8. If, however, the second eccentric 14 is released from the inner eccentric 10 and connected with the eccentric strap 15 so that it might be considered to be a part of the eccentric strap, then rotation of the inner eccentric 10 will result in movement of the eccentric strap 7. It is desirable therefore to provide a mechanism which will simultaneously release the two eccentrics from each other and also secured the second or outer eccentric to the eccentric strap. This mechanism may be of any suitable or desired construction and that shown by way of example in the accompanying drawing is arranged to be actuated by suitable means such as an electrical or a hydraulic mechanism. Such actuating mechanisms may be contained in a suitable housing 17 mounted on the eccentric strap 15 and 18 represents a conduit or tube for electrical conductors or tubing for an actuating fluid.

The means for coupling the two eccentrics together in the particular construction shown by way of example includes a dog or latch 20 which is pivoted at 21 to the second eccentric and which is located in a recess 22 of the second eccentric 14. This dog or latch has a tooth 24 formed to engage in a notch or recess in the inner eccentric 10, and preferably a spring 25 serves to urge the latch into position in which the tooth 24 enters into the notch in the first eccentric. This spring may be secured in any suitable manner to the second eccentric.

The latch preferably has an extension 28 by means of which it may be swung about its pivot 21 to move the tooth 24 out of its recess. This extension is preferably actuated by means of a locking plunger or slide 30 mounted to slide in a groove or guideway 31 formed in the eccentric strap, and this plunger is actuated by means of a solenoid, a fluid operated mechanism or any other suitable means contained in the housing 17. The second eccentric also has a recess 32 into which the plunger 30 may extend.

Figure 2:
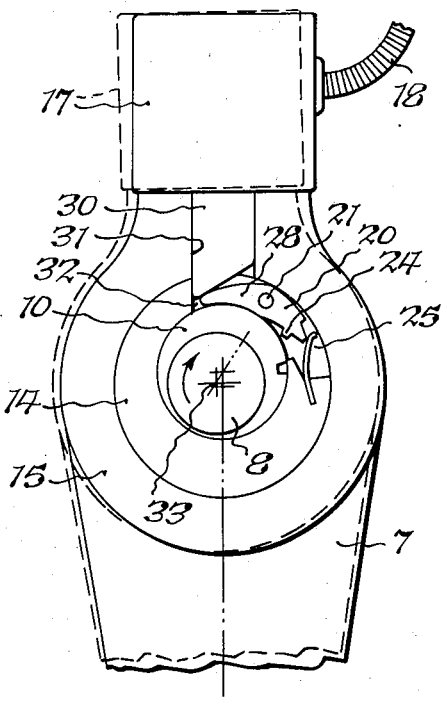
Fig. 2 is a similar view showing the parts in a position in which the reciprocatory motion has been started.

It will be readily seen by comparing Figs. 1 and 2 that when the plunger 30 is in its upper position in its guide groove 31 as shown in Fig. 1, the spring 25 will move the latch into position to connect the two eccentrics. Since the periphery of the second eccentric is concentric with the axis 33 of the drive shaft 8, it will be obvious that when the parts are in the position shown in Fig. 1 the second eccentric 14 rotates within the eccentric strap without imparting any motion to the same.

When the mechanism contained in the housing 17 moves the plunger 30 downwardly, this movement serves two functions. In the first place the plunger engages the extension 28 of the latch and thus swings the latch about its pivot 21 to withdraw the tooth 24 from its recess in the inner eccentric 10. At the same time the plunger 30 moves into the recess 32 in the second eccentric and thus firmly locks the second eccentric against turning relatively to the eccentric strap 15. The eccentric strap and the outer eccentric will consequently be moved by the inner eccentric 10 about the center 33 of the shaft 8, thus imparting movement to the eccentric strap.

In Fig. 2 I have shown the position of the parts after the inner eccentric 10 has moved the eccentric strap through a small angle, the broken lines showing the previous position of the eccentric strap and the full lines the position after such movement.

Figure 3:
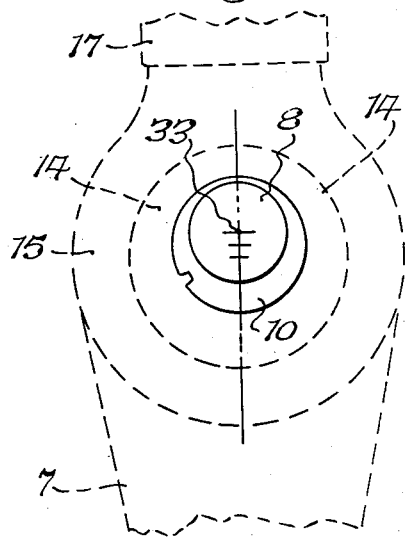
Fig. 3 is a similar view showing the parts of the mechanism when the reciprocatory member has been moved to the maximum extent.

In Fig. 3 I have indicated the eccentric 10 in a position in which it imparts its maximum throw to the eccentric 14 and the eccentric strap, after the half revolution of the shaft 8 and eccentric 10. The mechanism in the housing 17 for actuating the plunger 30 is not herein described since mechanisms of this type are well known to those skilled in this art.

In the use of the construction described, when the mechanism is actuated to produce a stroke of the eccentric strap, it is merely necessary to disconnect the second or outer eccentric from the inner eccentric and at the same time connect the second eccentric to the eccentric strap. This causes a gradual starting of the mechanism since the shaft 8 and eccentric 10 are of course in motion continuously and no inertia of these parts need be overcome, so that only the second eccentric 14 and the eccentric strap and parts connected therewith are moved, and this motion is very gradual because of the nature of the eccentrics. Consequently, the mechanism or machine driven by the construction illustrated is not subjected to severe vibrations and jars which heretofore resulted each time that the mechanism was required to make a stroke. When a stroke has been completed or slightly before, the plunger 30 is moved upwardly by the mechanism in the housing 17, whereupon the latch 20 moves into engagement with the inner eccentric 10 which stops movement of the eccentric strap and parts connected therewith.

It will be understood that various changes in the details, materials and arrangements of parts, which have been herein described and illustrated in order to explain the nature of the invention, may be made by those skilled in the art, within the principle and scope of the invention, as expressed in the appended claims.

I claim:

1. Mechanism for converting rotary motion into reciprocatory motion, including a rotary shaft, an eccentric rigidly secured on said shaft and of larger external diameter than said shaft, a second eccentric rotatably mounted on said first mentioned eccentric and having a throw substantially equal to the throw of said first eccentric, an eccentric strap extending about said second eccentric, means for releasably connecting said eccentrics when no reciprocatory motion is desired, and means for connecting said second eccentric with said eccentric strap and simultaneously disconnecting said second eccentric from said first eccentric when reciprocatory motion is desired.

2. Mechanism according to claim 1 in which said means for releasably connecting said eccentrics is in the form of a spring actuated latch pivoted on said second eccentric and having a tooth formed to engage a part of said first eccentric.

3. Mechanism for converting rotary motion into reciprocatory motion, including a rotary shaft, an eccentric rigidly secured on said shaft and of larger external diameter than said shaft, a second eccentric rotatably mounted on said first mentioned eccentric and having a throw substantially equal to the throw of said first eccentric, an eccentric strap extending about said second eccentric, a latch pivoted on said second eccentric and having a tooth formed to engage with said first eccentric for causing said two eccentrics to move as one, yielding means acting on said latch in a direction to cause said tooth to move into engagement with said first eccentric, said second eccentric having a recess in which said latch and said yielding means are arranged, a plunger mounted on said eccentric strap and movable into and out of said recess in said second eccentric into position to swing said latch out of engagement with said first eccentric and to hold said second eccentric against rotation.

4. Mechanism for converting rotary motion into reciprocatory motion, including a rotary shaft, an eccentric rigidly secured on said shaft and of larger external diameter than said shaft, a second eccentric rotatably mounted on said first mentioned eccentric and having a throw substantially equal to the throw of said first eccentric, an eccentric strap extending about said second eccentric, means for releasably connecting said eccentrics when no reciprocatory motion is desired, said second eccentric having a recess in which said means for releasably connecting said eccentrics are located, and a plunger slidably mounted on said eccentric strap and movable into said recess of said second eccentric and engaging said eccentric connecting means to release said second eccentric from said first eccentric and holding said second eccentric against rotation relative to said eccentric strap.

No references cited.